US012748462B2

(12) United States Patent
Gwak et al.

(10) Patent No.: US 12,748,462 B2
(45) Date of Patent: Sep. 29, 2026

(54) ELASTIC MEMBER AND DISPLAY DEVICE COMPRISING SAME

(71) Applicant: LG INNOTEK CO., LTD., Seoul (KR)

(72) Inventors: Jung Min Gwak, Seoul (KR); Sang Jun Ko, Seoul (KR); Duck Hoon Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 414 days.

(21) Appl. No.: 18/025,217

(22) PCT Filed: Sep. 3, 2021

(86) PCT No.: PCT/KR2021/011944
§ 371 (c)(1),
(2) Date: Mar. 8, 2023

(87) PCT Pub. No.: WO2022/055185
PCT Pub. Date: Mar. 17, 2022

(65) Prior Publication Data

US 2024/0012453 A1 Jan. 11, 2024

(30) Foreign Application Priority Data

Sep. 8, 2020 (KR) ........................ 10-2020-0114589

(51) Int. Cl.
*G06F 1/16* (2006.01)
*B32B 3/30* (2006.01)
(Continued)

(52) U.S. Cl.
CPC .......... *G06F 1/1656* (2013.01); *G06F 1/1616* (2013.01); *G06F 1/1652* (2013.01); *G06F 1/1681* (2013.01)

(58) Field of Classification Search
CPC ............ H10K 2102/311; H10K 77/111; G02F 1/133305; G02F 1/133308; G06F 1/1652;
(Continued)

(56) References Cited

U.S. PATENT DOCUMENTS 9,983,424 B2 5/2018 Kim et al.
10,490,771 B2 11/2019 Kim et al.
(Continued)

FOREIGN PATENT DOCUMENTS

CN 106252378 12/2016
CN 110518039 A * 11/2019 ............. G09F 9/301
(Continued)

OTHER PUBLICATIONS

English Language Translation of CN-110518039-A (Year: 2019).*
(Continued)

*Primary Examiner* — Maria V Ewald
*Assistant Examiner* — Daniel P Dillon
(74) *Attorney, Agent, or Firm* — KED & ASSOCIATES

(57) ABSTRACT

An elastic member including a first region and a second region. The first region is defined as a folding region and the second region is defined as an unfolding region. The elastic member includes a first direction defined as a width direction of the elastic member, and a second direction defined as a longitudinal direction of the elastic member. The first region includes a 1-1 region closer to a folding axis, and a 1-2 region that is further from the folding axis than the 1-1 region. The first region includes a first pattern part extending in the first direction, and a bridge part extending the first pattern part in the second direction. A number of the bridge part in the 1-1 region is 50% or less than a number of bridge pars in the 1-2 region.

10 Claims, 14 Drawing Sheets

(51) Int. Cl.
*G09F 9/30* (2006.01)
*H10K 102/00* (2023.01)

(58) Field of Classification Search
CPC ............. H04M 1/0268; H04M 1/0214; H04M 1/0216; B32B 3/30; B32B 3/266
See application file for complete search history.

(56) References Cited

U.S. PATENT DOCUMENTS

| | | | |
|---|---|---|---|
| 11,108,011 B2 | 8/2021 | Kim et al. | |
| 11,209,867 B2 | 12/2021 | Cao et al. | |
| 11,546,986 B2 | 1/2023 | Wang et al. | |
| 2016/0357052 A1* | 12/2016 | Kim | H10K 59/87 |
| 2018/0190936 A1* | 7/2018 | Lee | B32B 15/04 |
| 2019/0132987 A1 | 5/2019 | Koo et al. | |
| 2019/0207141 A1 | 7/2019 | Kim et al. | |
| 2020/0052239 A1 | 2/2020 | Kim et al. | |
| 2021/0149448 A1* | 5/2021 | Cao | G06F 1/1652 |
| 2021/0168929 A1 | 6/2021 | Wang et al. | |

FOREIGN PATENT DOCUMENTS

| | | |
|---|---|---|
| CN | 110792905 | 2/2020 |
| CN | 110853520 | 2/2020 |
| CN | 111081899 | 4/2020 |
| CN | 210627726 | 5/2020 |
| KR | 10-2016-0144912 | 12/2016 |
| KR | 10-2018-0079091 | 7/2018 |
| KR | 10-2019-0049240 | 5/2019 |
| KR | 10-2020-0049925 | 5/2020 |
| KR | 10-2020-0061272 | 6/2020 |
| KR | 10-2020-0087470 | 7/2020 |

OTHER PUBLICATIONS

International Search Report dated Dec. 16, 2021 issued in Application No. PCT/KR2021/011944.
Chinese Office Action dated May 15, 2025 issued in Application No. 202180061722.6.

* cited by examiner

【FIG. 1】
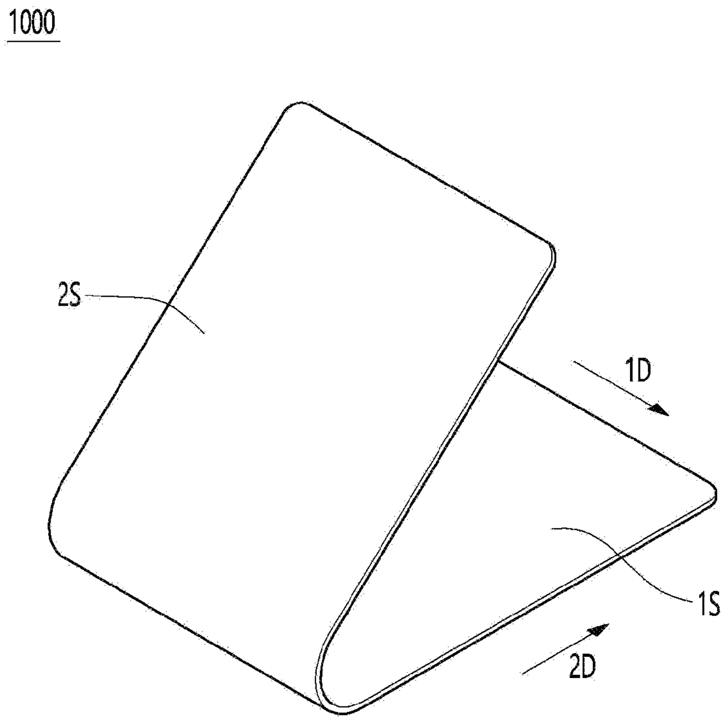
【FIG. 2】
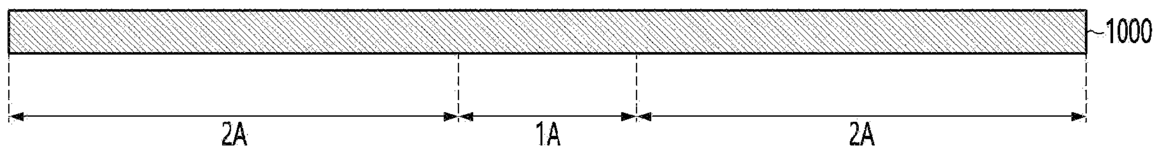

【FIG. 3】
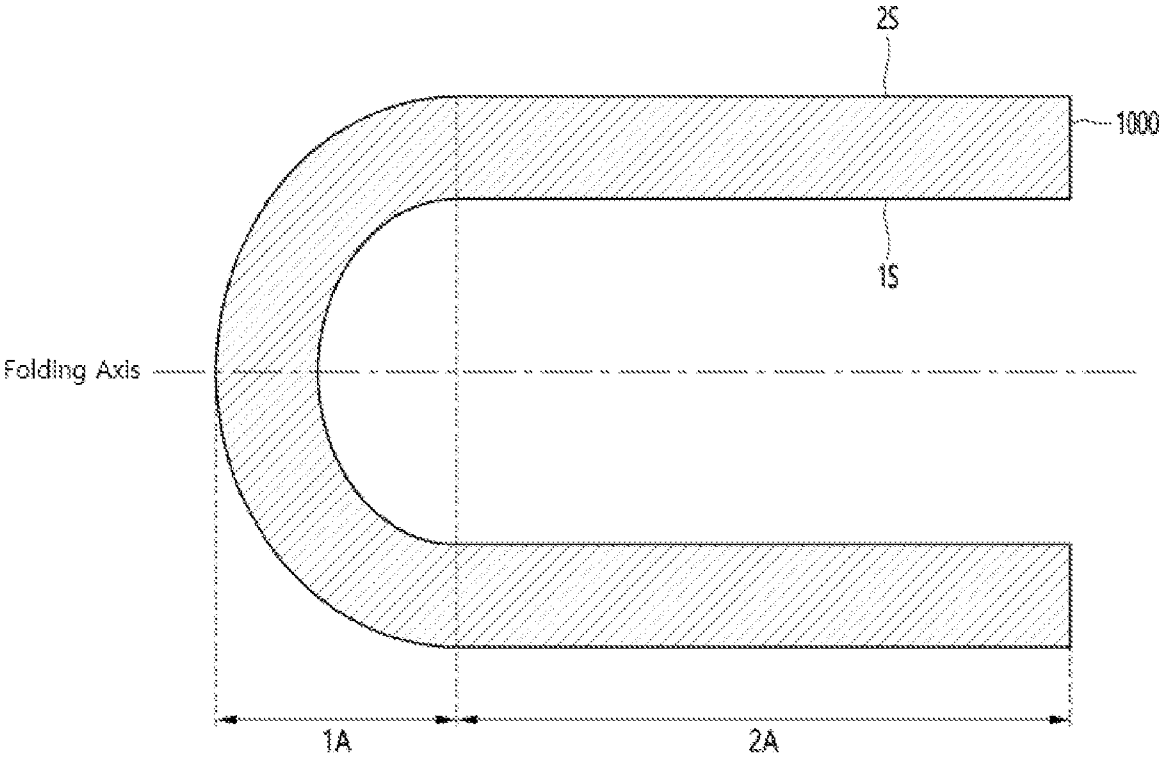

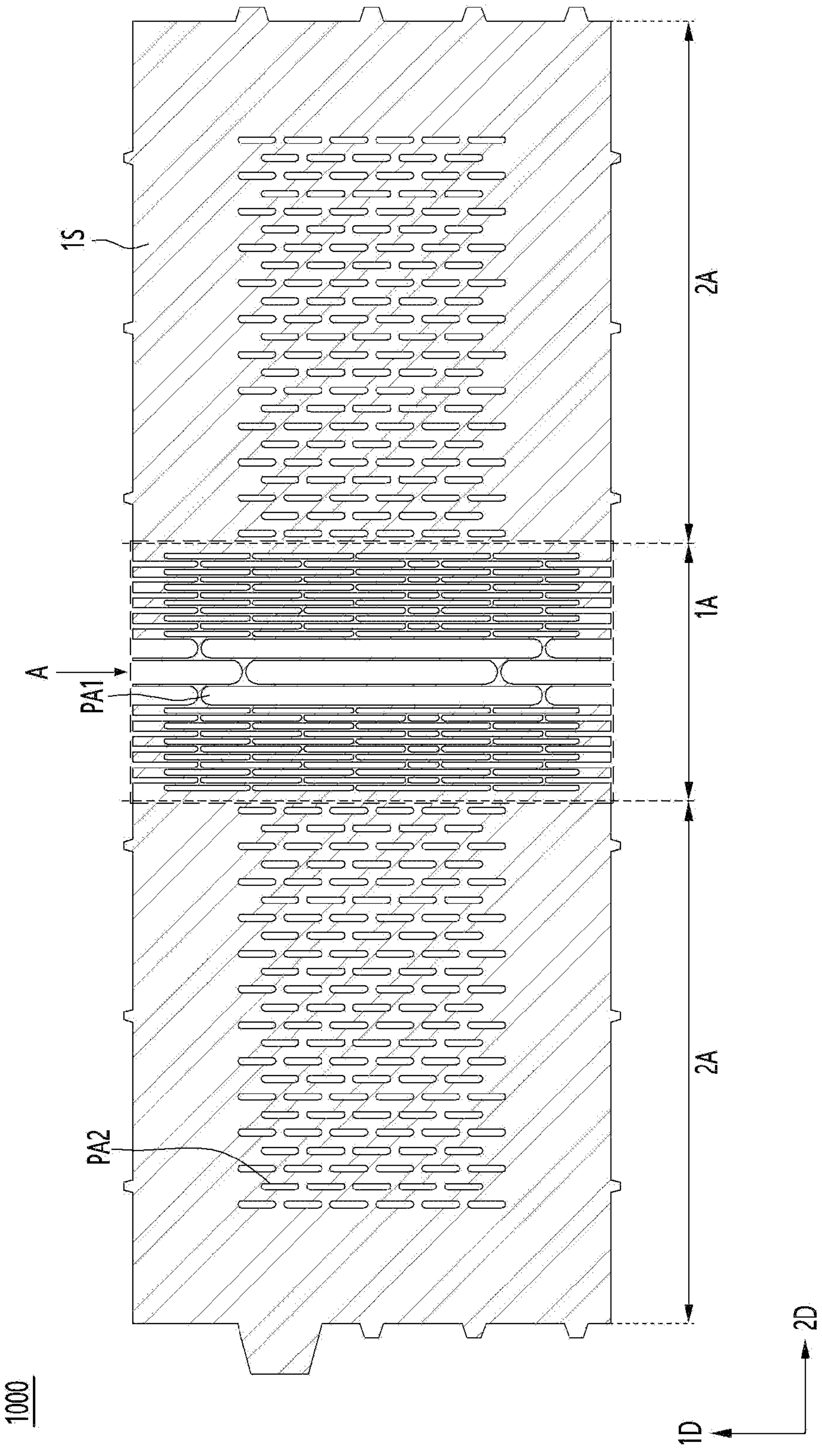
【FIG. 4】

【FIG. 5】
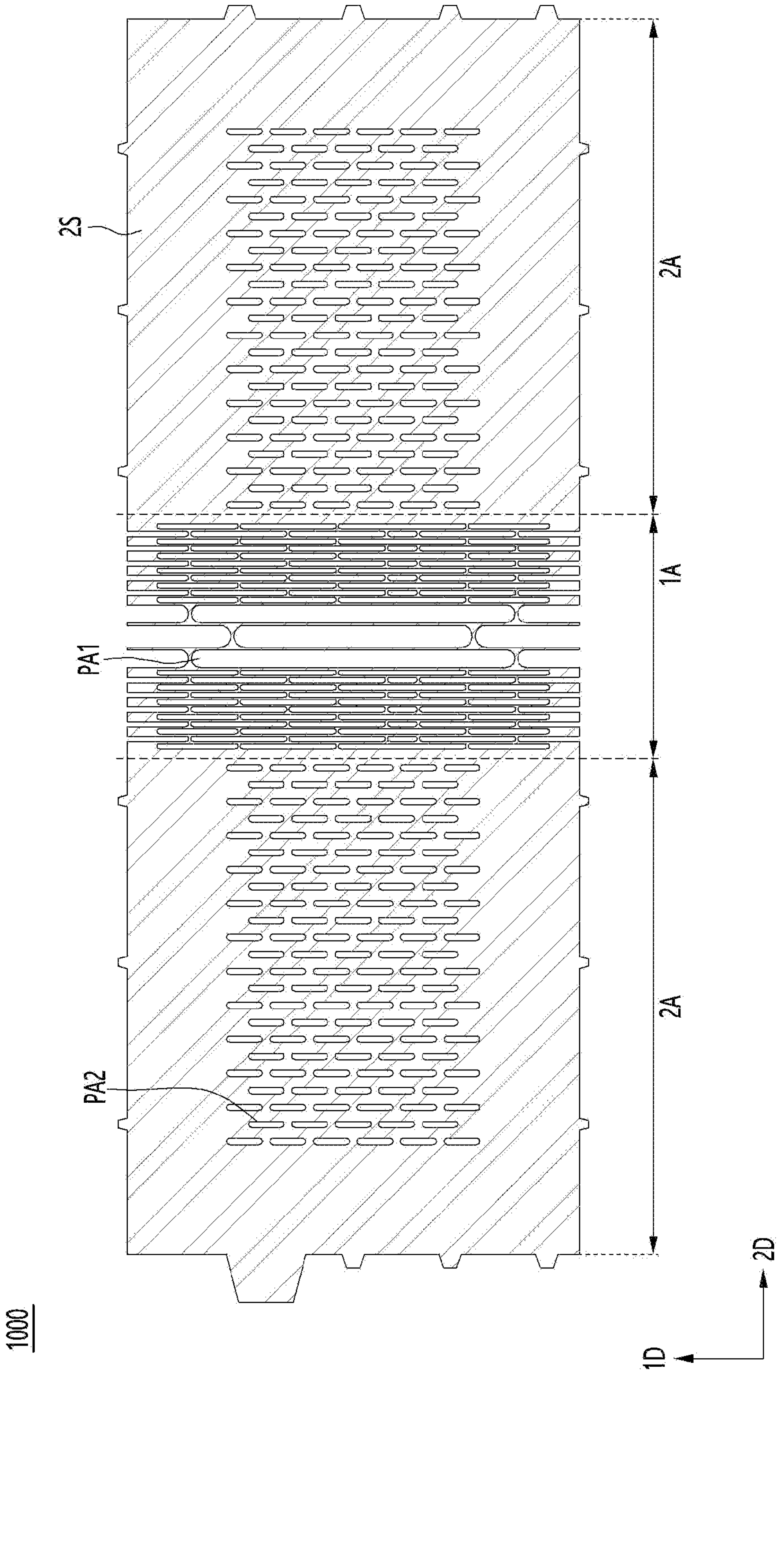

【FIG. 6】
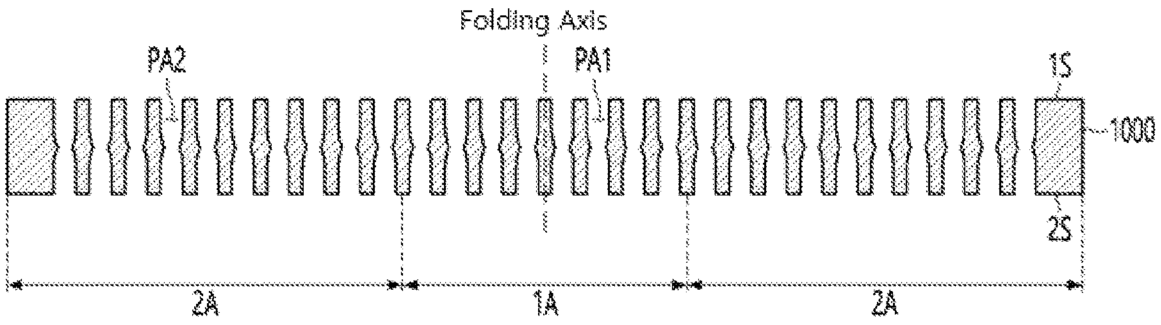
【FIG. 7】
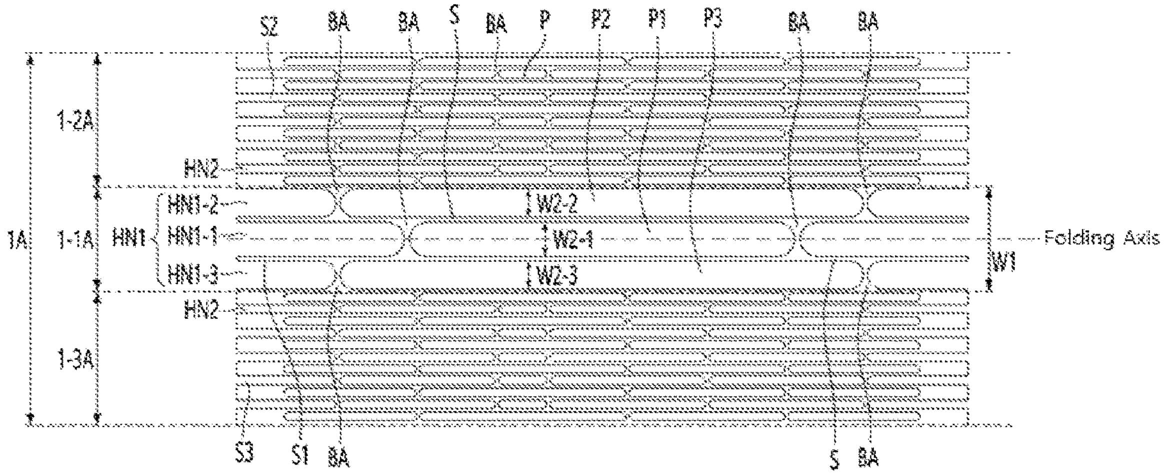

【FIG. 8】
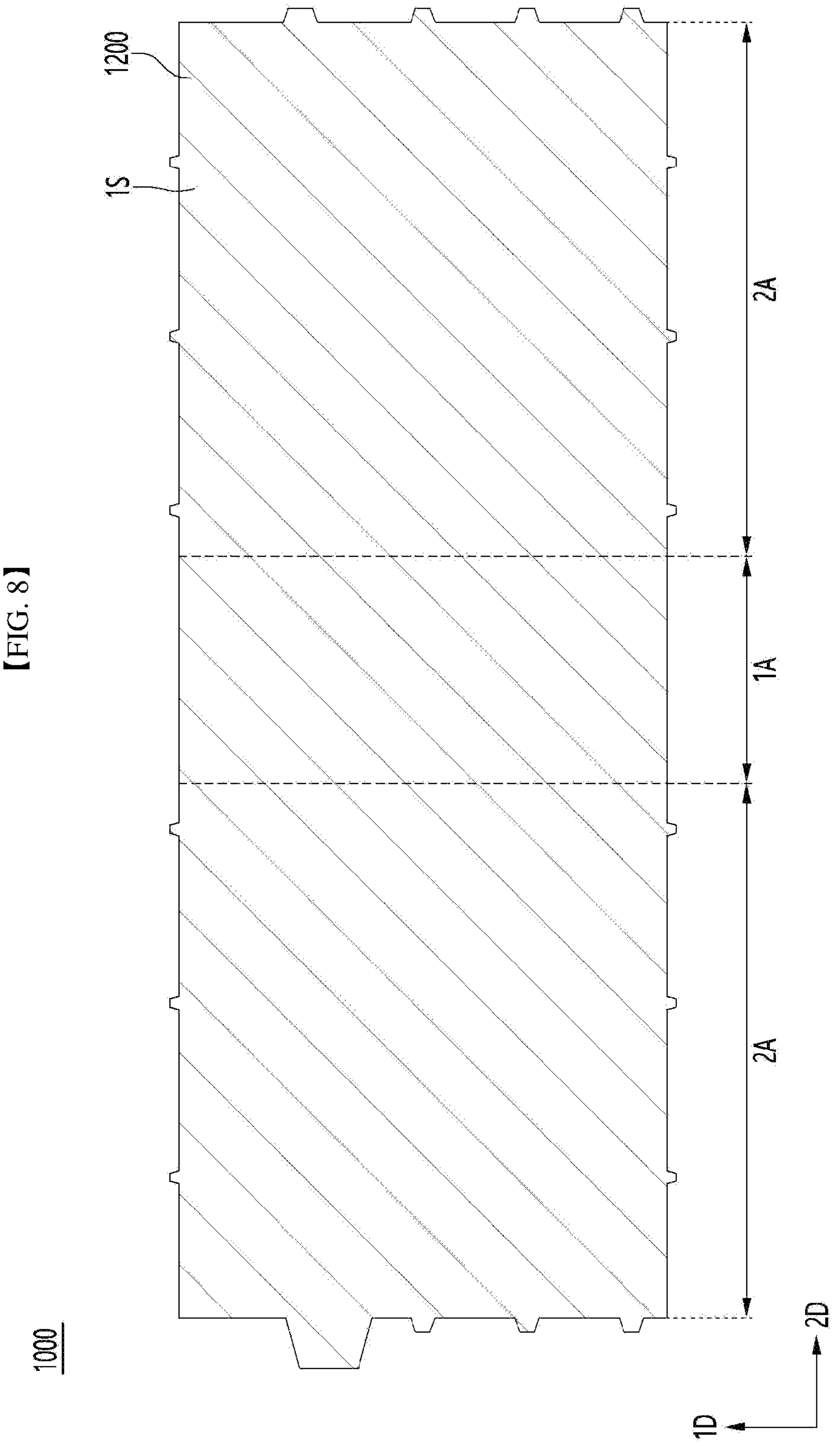

【FIG. 9】
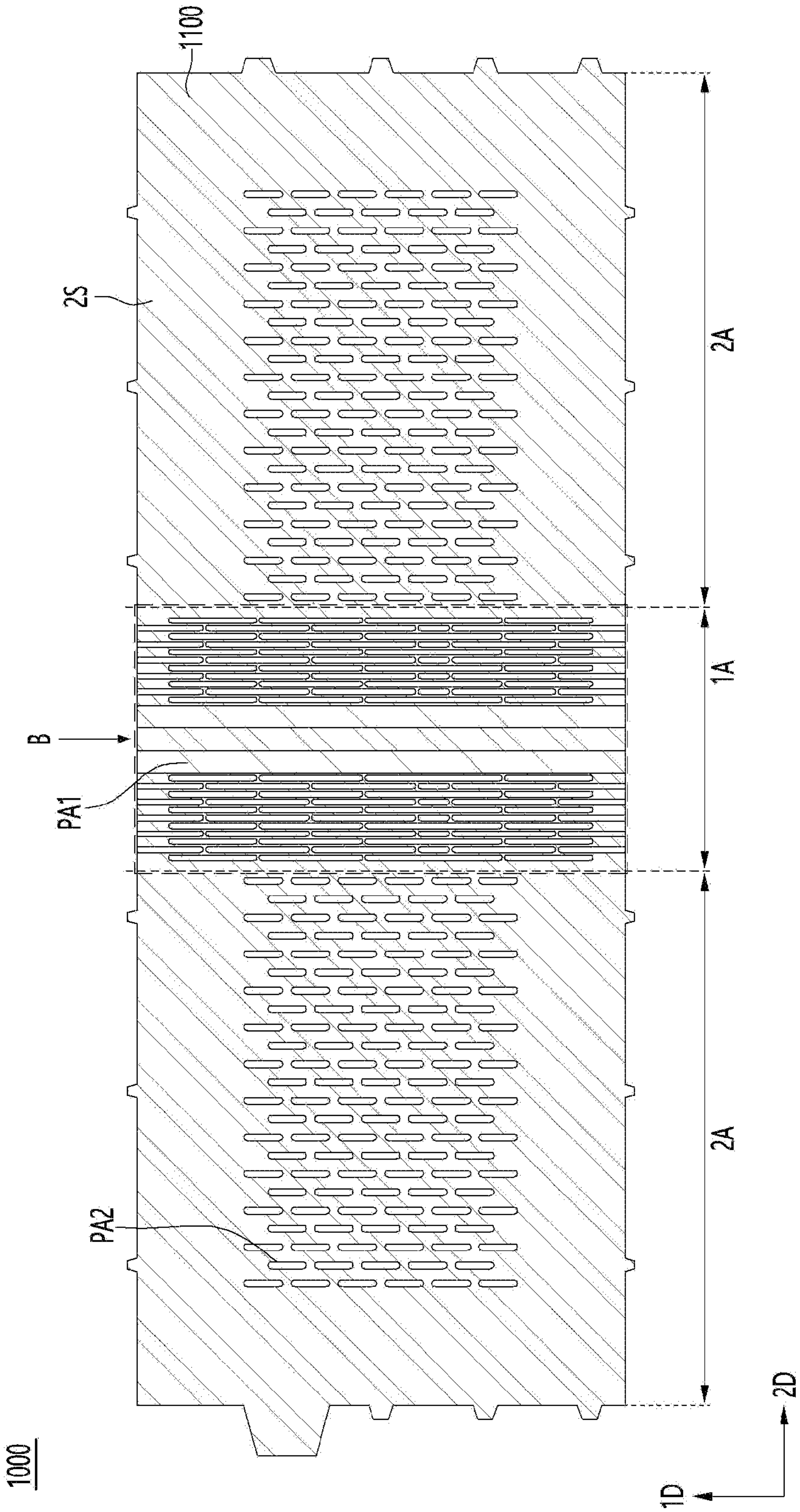

【FIG. 10】
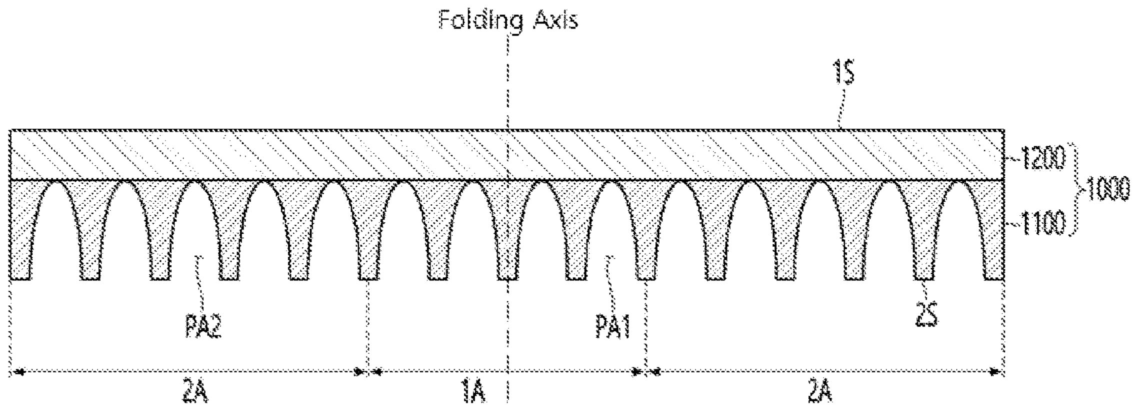
【FIG. 11】
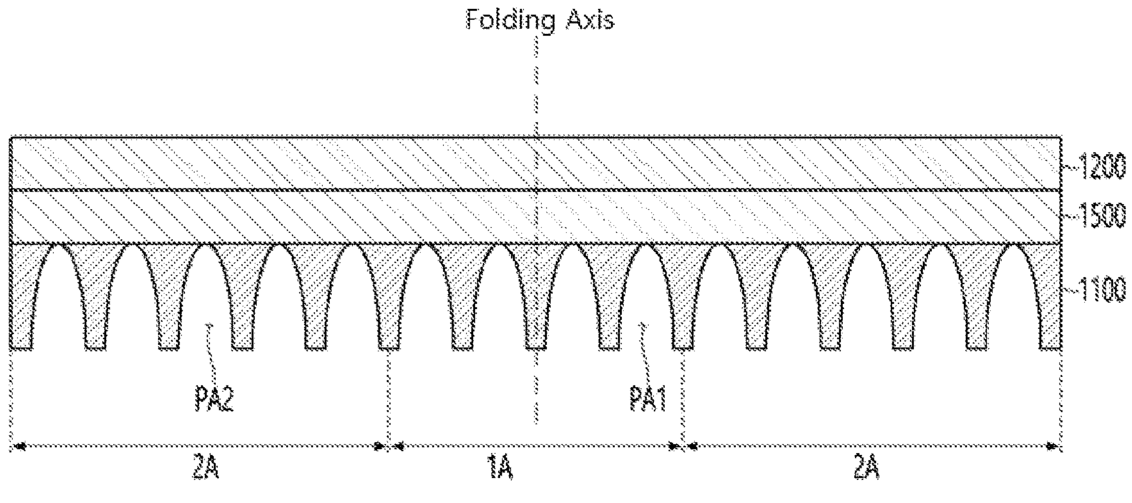

【FIG. 12】
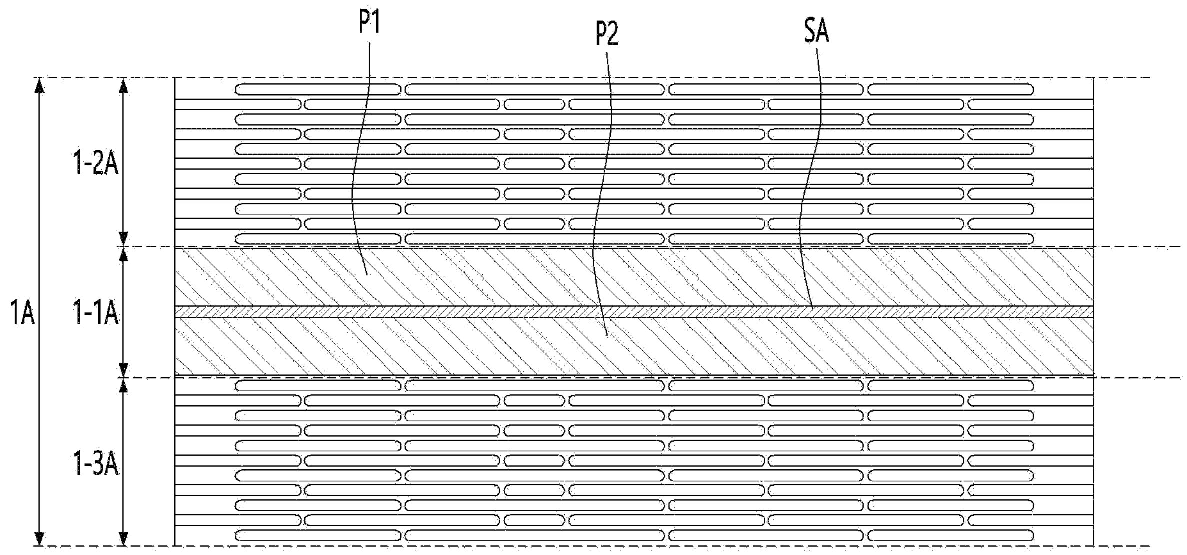
【FIG. 13】
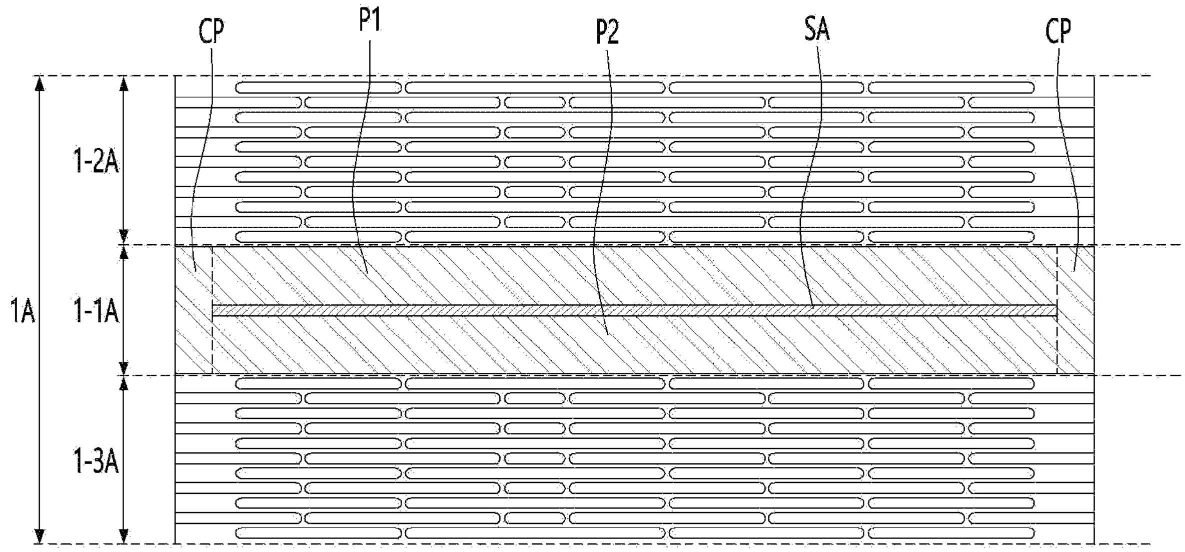

【FIG. 14】
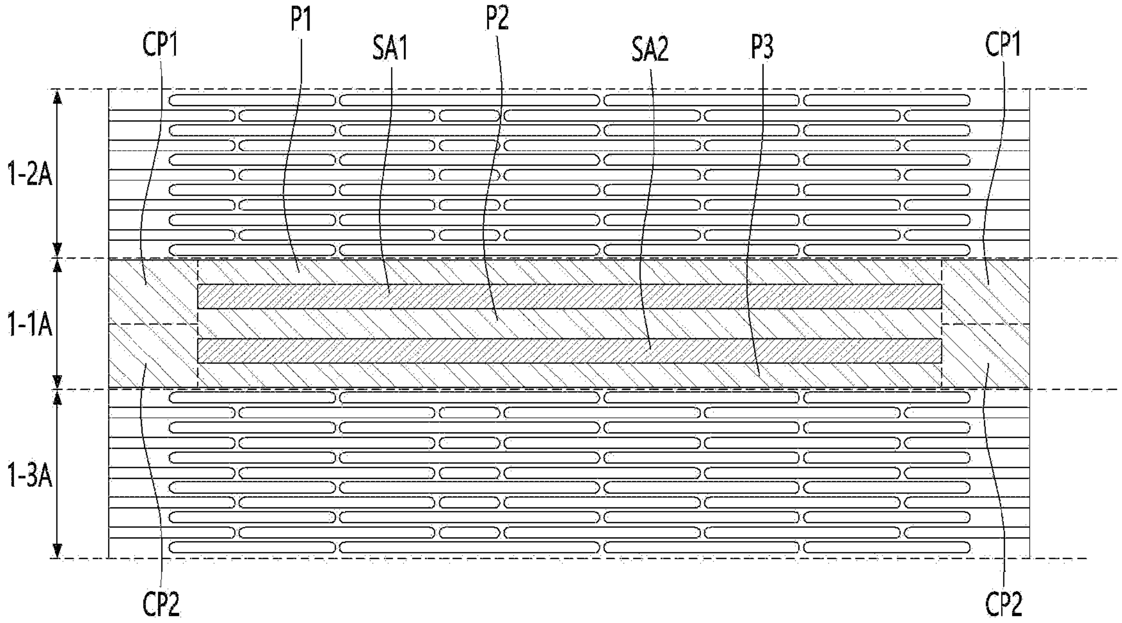
【FIG. 15】
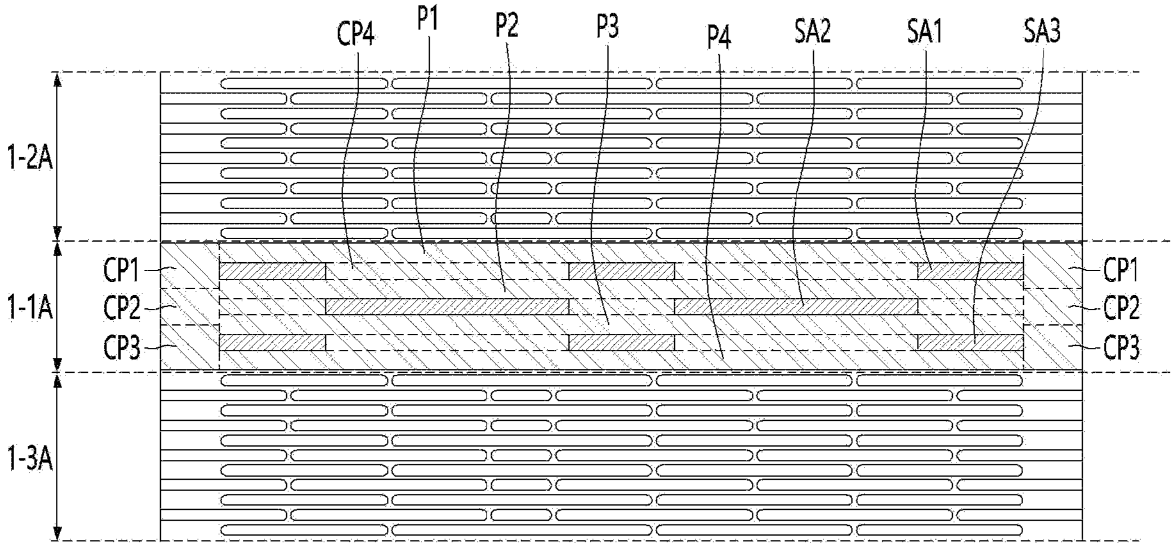

【FIG. 16】
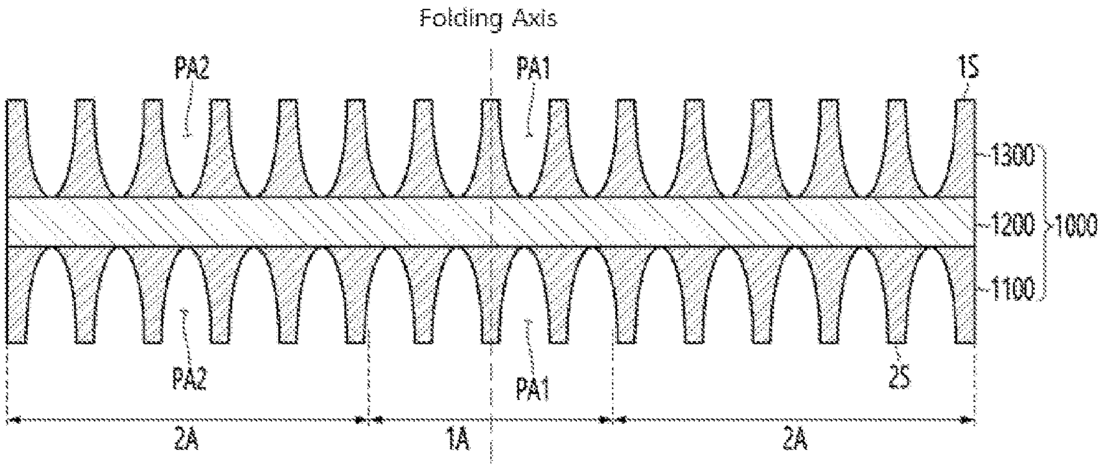
【FIG. 17】
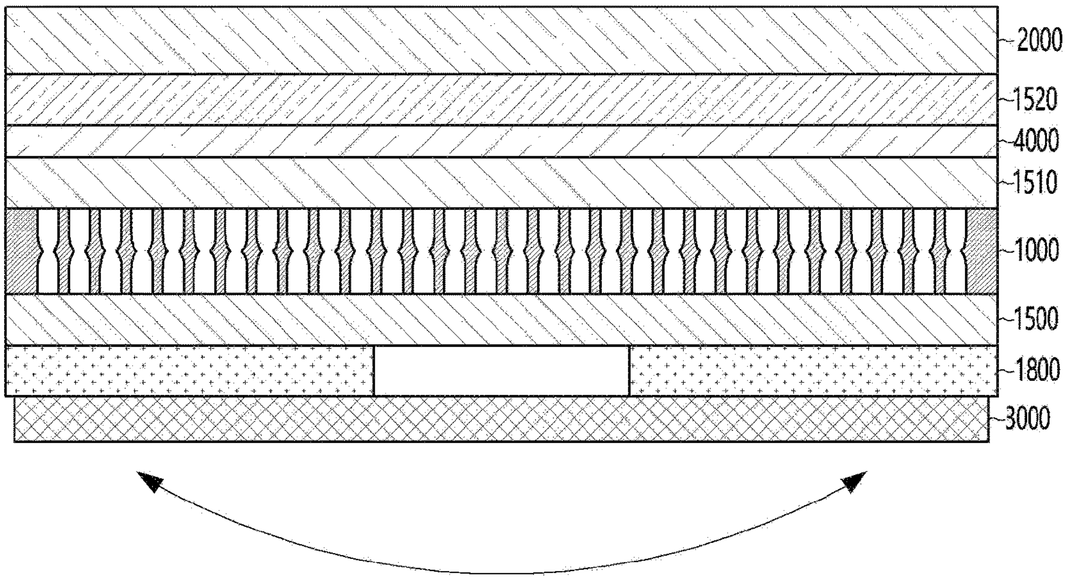

【FIG. 18】
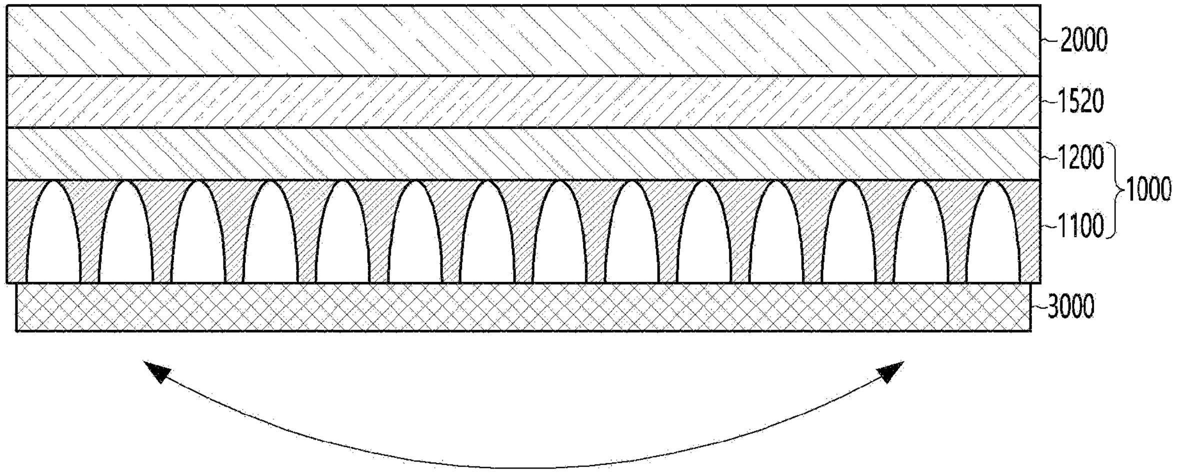
【FIG. 19】
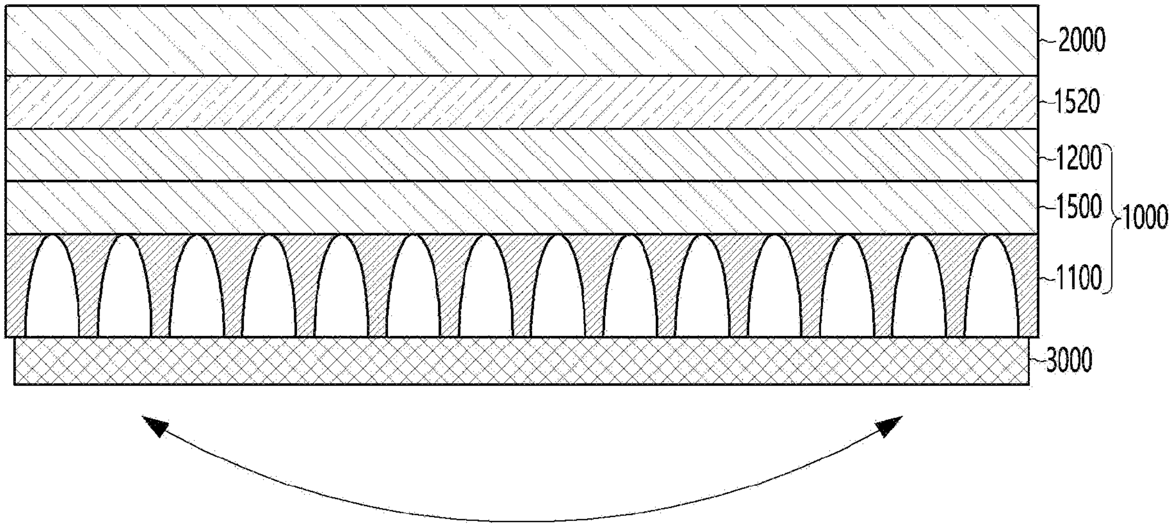

【FIG. 20】
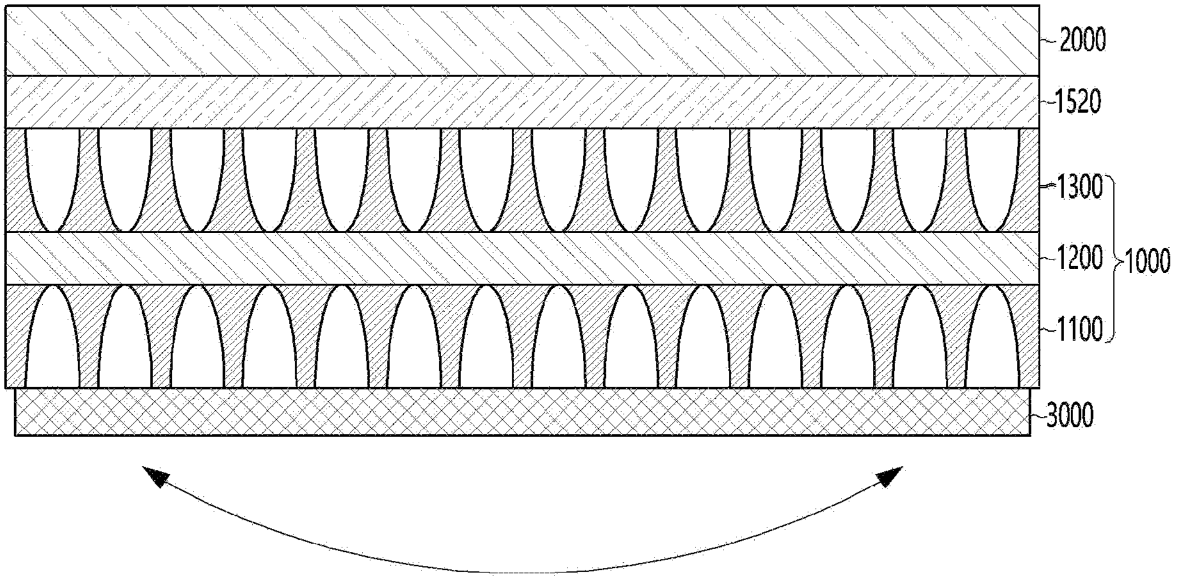
【FIG. 21】
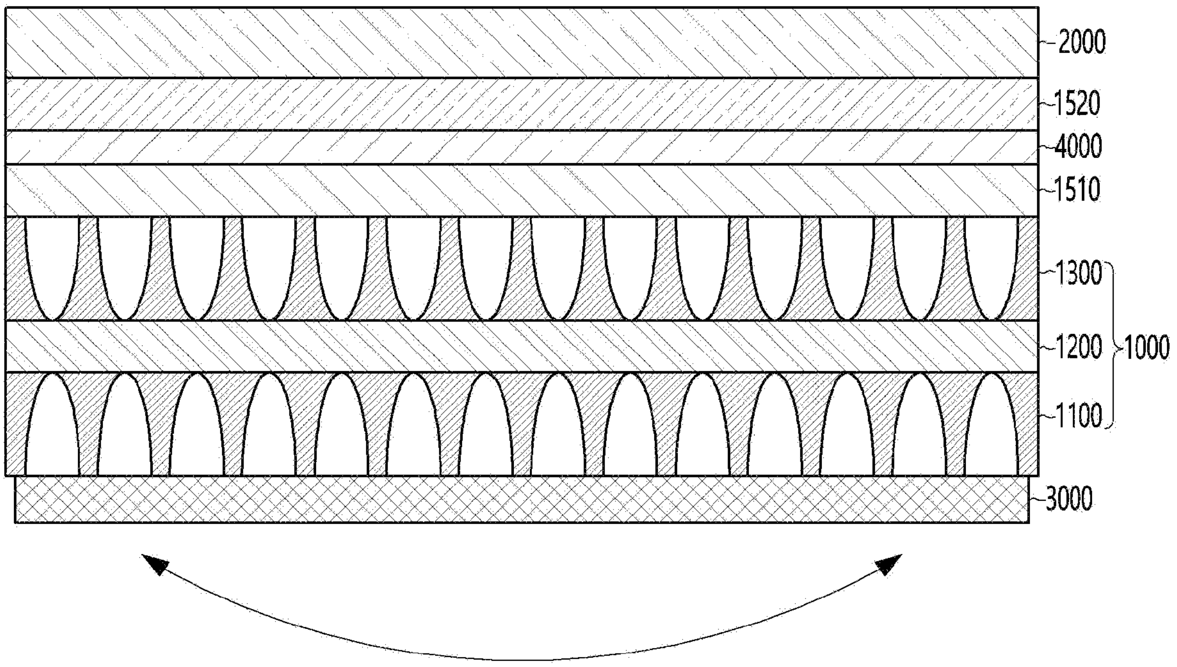

【FIG. 22】
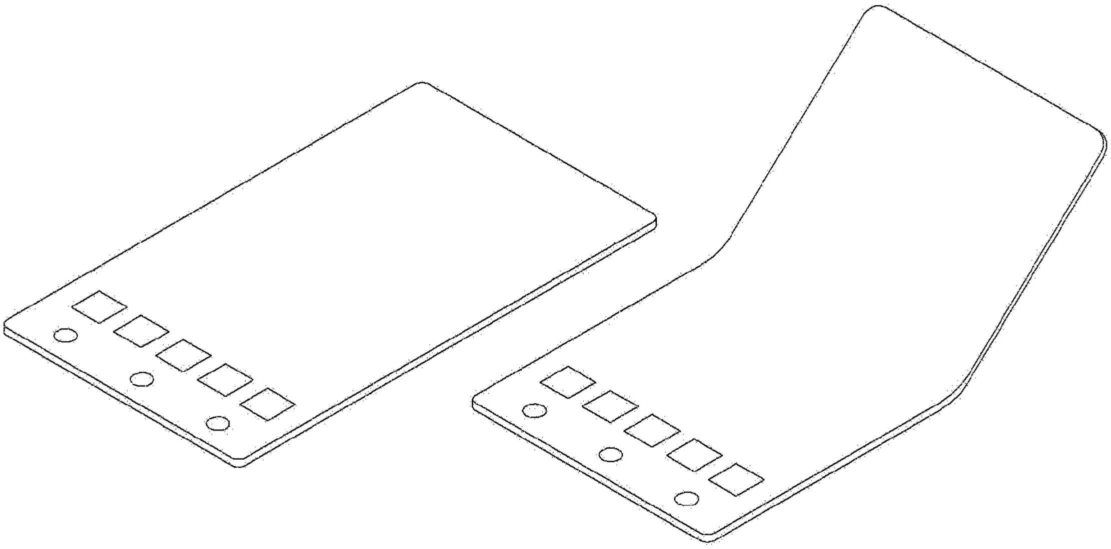

ELASTIC MEMBER AND DISPLAY DEVICE COMPRISING SAME

CROSS-REFERENCE TO RELATED PATENT APPLICATIONS

This application is a U.S. National Stage Application under 35 U.S.C. § 371 of PCT Application No. PCT/KR2021/011944, filed Sep. 3, 2021, which claims priority to Korean Patent Application No. 10-2020-0114589, filed Sep. 8, 2020, whose entire disclosures are hereby incorporated by reference.

TECHNICAL FIELD

The embodiment relates to an elastic member and a display device including the same.

BACKGROUND ART

Recently, there is an increasing demand for a flexible or foldable display device capable of easily carrying various applications and displaying an image on a large screen when being carried.

Such a flexible or foldable display device is folded or partially bent when being carried or stored, and may be implemented with the display unfolded when displaying images. Accordingly, an image display region may be increased, and a user may easily carry the display.

After the flexible or foldable display device is folded or bent, a restoration process of unfolding the flexible display device again may be repeated.

That is, since the flexible or foldable display device repeats folding and unfolding operations, the substrate of the flexible display device requires predetermined strength and elastic force, and cracks or deformation should not occur in the substrate during folding and restoration.

Meanwhile, a substrate for display, which is an elastic member constituting the flexible or foldable display device, may be applied to the display device. That is, it may be applied to the display device displaying a screen by disposing a display panel or a touch panel on the elastic member.

Meanwhile, when the flexible or foldable display device is folded or unfolded, tensile stress and compressive stress are generated, and damage such as cracks may occur in the folding region of the elastic member due to the stress.

In particular, in the folding region of the elastic member, stress may be greater in the central region than in the outer region. Accordingly, when the flexible or foldable display device is folded or unfolded, it may not be easy to fold or restore it due to stress generated in the center of the folding region, and cracks may occur in the folding region after folding.

Accordingly, there is a need for the elastic member having a new structure capable of solving the above problems.

DISCLOSURE

Technical Problem

An embodiment is related to providing an elastic member having improved folding characteristic.

Technical Solution

An elastic member according to the embodiment includes a first region and a second region, the first region is defined as a folding region, and the second region is defined as an unfolding region, the elastic member includes a first direction defined as a width direction of the elastic member; and a second direction defined as the longitudinal direction of the elastic member, the first region includes a 1-1 region closer to a folding axis and a 1-2 region farther from the folding axis than the 1-1 region, the first region includes a first pattern part extending in the first direction, the first region includes a bridge portion extending the first pattern part in the second direction, in the first region, the number of bridges in the 1-1 region is 50% or less of the number of bridges in the 1-2 region.

An elastic member according to the embodiment includes a first region and a second region, the first region is defined as a folding region, and the second region is defined as an unfolding region, the elastic member includes a first layer and a second layer on the first layer, the elastic member includes a first direction defined as a width direction of the elastic member; and a second direction defined as the longitudinal direction of the elastic member, the first region includes a 1-1 region closer to a folding axis than other regions of the first region, a first pattern part penetrating the first layer is disposed in the 1-1 region, the first pattern part includes a first pattern and a second pattern spaced apart from each other, the first pattern and the second pattern extend to both ends of the elastic member in the first direction.

An elastic member according to the embodiment includes a first region and a second region, the first region is defined as a folding region, and the second region is defined as an unfolding region, the elastic member includes a first layer and a second layer on the first layer, the elastic member includes a first direction defined as a width direction of the elastic member; and a second direction defined as the longitudinal direction of the elastic member, the first region includes a 1-1 region closer to a folding axis than other regions of the first region, a first pattern part penetrating the first layer is disposed in the 1-1 region, the first pattern part includes a first pattern, a second pattern, and a third pattern spaced apart from each other, a first support part disposed between the first pattern and the second pattern, a second support part disposed between the second pattern and the third pattern, a first connection pattern is disposed between the first support part and both ends of the elastic member in the first direction, a second connection pattern is disposed between the second support part and both ends of the elastic member in the first direction, the first pattern, the second pattern, and the third pattern are connected by the first connection pattern and the second connection pattern, the first pattern part further comprises a fourth pattern and a third support part disposed between the third pattern and the fourth pattern, the first support part, the second support part and the third support part do not overlap each other in the second direction of the elastic member.

Advantageous Effects

In the elastic member according to the embodiment, the size of the first pattern part disposed in the folding region and the size of the hinge part may be different.

That is, since the size and area of the first pattern part in the folding region close to the folding axis is larger than that of the first pattern part in the folding region far from the folding axis, when the elastic member is folded, the elastic member may be easily folded in a region close to a folding axis where the compressive stress is relatively high, and plastic deformation due to tensile stress may be reduced.

In addition, since the size and area of the hinge part in the folding region close to the folding axis is larger than that of the hinge part in the folding region far from the folding axis, when the elastic member is folded, the elastic member may be easily folded in a region close to a folding axis where the compressive stress is relatively high.

In addition, since the distance between the hinge parts in the folding region close to the folding axis is smaller than the distance between the hinge parts in the folding region far from the folding axis, when the elastic member is folded, the elastic member may be easily folded in a region close to a folding axis where the compressive stress is relatively high.

Therefore, the elastic member according to the embodiment may easily fold the elastic member and reduce plastic deformation due to tensile stress during restoration.

In the elastic member according to another embodiment, the pattern part of the folding region close to the folding axis may be wider.

Accordingly, when the elastic member is folded, the elastic member may be easily folded in a region close to a folding axis where the compressive stress is relatively high, and plastic deformation due to tensile stress may be reduced.

In addition, one or a plurality of support parts may be disposed on a region close to the folding axis, and a size of the support part may be controlled to prevent a panel on the elastic member from sinking by the pattern part due to the size of the pattern part.

In addition, by changing the position of the support part and connecting the pattern parts to each other, it is possible to improve the stress reduction effect by the pattern part, and since movement of the stress is blocked by the pattern parts, it is possible to prevent stress from being concentrated in a specific region.

DESCRIPTION OF DRAWINGS

FIG. 1 is a perspective view of an elastic member according to an embodiment.

FIG. 2 is a side view of the elastic member before folding according to the embodiment.

FIG. 3 is a side view of the elastic member after folding according to the embodiment.

FIG. 4 is a top view of the first surface of an elastic member according to a first embodiment.

FIG. 5 is a top view of the second surface of the elastic member according to the first embodiment.

FIG. 6 is a cross-sectional view of the elastic member according to the first embodiment.

FIG. 7 is an enlarged view of region A of FIG. 5.

FIG. 8 is a top view of the first surface of an elastic member according to a second embodiment.

FIG. 9 is a top view of a second face of the elastic member according to the second embodiment.

FIGS. 10 and 11 are cross-sectional views of the elastic member according to the second embodiment.

FIG. 12 is an enlarged view of region B of FIG. 9.

FIGS. 13 to 15 are various enlarged views of region B of FIG. 9.

FIG. 16 is a cross-sectional view of an elastic member according to a third embodiment.

FIGS. 17 to 21 are cross-sectional views of a display device including the elastic member according to the embodiment.

FIG. 22 is a view for describing an application example of an elastic member according to embodiments.

MODES OF THE INVENTION

Hereinafter, preferred embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced. In addition, unless expressly otherwise defined and described, the terms used in the embodiments of the present invention (including technical and scientific terms) may be construed the same meaning as commonly understood by one of ordinary skill in the art to which the present invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected" or "coupled" to another element, it may include not only when the element is directly "connected" or "coupled" to other elements, but also when the element is "connected" or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an elastic member according to an embodiment will be described with reference to the drawings.

FIG. 1 is a perspective view of an elastic member according to an embodiment, FIGS. 2 and 3 are side views of the elastic member before and after folding according to the embodiment.

Referring to FIG. 1, the elastic member 1000 may be flexible or foldable. That is, the elastic member 1000 may be bent in one direction. That is, the elastic member 1000 may be a substrate for a display applied to a flexible display device or a foldable display device.

The elastic member 1000 may include a metal material. For example, the elastic member 1000 may include metal, metal alloy, plastic, a composite material (e.g., carbon fiber reinforced plastic, a magnetic or conductive material, a glass fiber reinforced material, etc.), ceramic, sapphire, glass, and the like. For example, the elastic member 1000 may include stainless steel (SUS).

The elastic member 1000 may be formed as a single layer or as a multilayer including a plurality of layers.

The elastic member 1000 may be defined in a first direction 1D and a second direction 2D that is different from the first direction 1D. For example, the first direction 1D may be defined as the same direction as the folding axis direction of the elastic member 1000, and the second direction may be a direction perpendicular to the first direction.

In addition, any one of the first direction 1D and the second direction 2D may be defined as a width direction of the elastic member 1000, and the other direction may be defined as a longitudinal direction of the elastic member 1000.

The elastic member 1000 may be folded using any one of a width direction and a longitudinal direction of the elastic member 100 as a folding axis.

Hereinafter, for convenience of description, the first direction is defined as the same direction as the folding axis. In addition, the first direction is defined as a width direction of the elastic member 1000, and the second direction is defined as a longitudinal direction of the elastic member 1000.

Referring to FIGS. 2 and 3, the elastic member 1000 may include at least two region s. In detail, the elastic member 1000 may include a first region 1A and a second region 2A The first region 1A may be defined as a region where the elastic member 1000 is folded. That is, the first region 1A may be a folding region.

In addition, the second region 2A may be defined as a region where the elastic member 1000 is not folded. That is, the second region 2A may be an unfolding region.

Referring to FIG. 3, the elastic member 1000 may be bent in one direction.

In detail, the elastic member 1000 may include a first surface 1S and a second surface 2S opposite to the first surface 1S. Although FIG. 3 shows that the first surfaces 1S of the elastic member 1000 are bent to face each other, the embodiment is not limited thereto, and the elastic member 1000 may be bent such that the second surfaces 2S face each other.

The first region 1A and the second region 2A may be regions defined when the elastic member 1000 is bent in a direction in which the first or second surfaces face each other.

In detail, the elastic member 1000 is bent in one direction, and the elastic member 1000 may be divided into the first region 1A which is a folded region (folding region) and the second region 2A which is a unfolded region (unfolding region).

Meanwhile, in the following, for convenience of description, the first surface 1S is defined as a surface facing a panel such as the display panel or touch panel.

Referring to FIGS. 2 and 3, the elastic member 1000 may include the first region 1A that is a region where the elastic member 1000 is bent. In addition, the elastic member 1000 may include the second region 2A that is not bent and is disposed adjacent to the first region 1A.

For example, the second region 2A may be formed on the left side and the right side of the first region 1A based on the direction in which the elastic member 1000 is bent. That is, the second region 2A may be disposed at both ends of the first region 1A. That is, the first region 1A may be disposed between the second regions 2A.

The first region 1A and the second region 2A may be formed on the same elastic member 1000. That is, the first region 1A and the second region 2A may be formed integrally with each other without being separated on the same elastic member 1000.

Sizes of the first region 1A and the second region 2A may be different from each other. In detail, the size of the second region 2A may be larger than the size of the first region 1A.

Referring to FIG. 3, the elastic member 1000 may be folded in one direction around a folding axis. In detail, the elastic member 1000 may be folded in a direction in which the first surfaces 1S face each other along a folding axis.

As the elastic member 1000 is folded in one direction, the first region 1A and the second region 2A may be formed on the elastic member 1000. That is, the folding region formed by folding the elastic member 1000 in one direction and the unfolding region positioned at both ends of the folding region may be formed in the elastic member 1000.

The folding region may be defined as a region where a curvature R is formed, and the unfolded region may be defined as a region where the curvature R is not formed or the curvature is close to zero.

As the elastic member 1000 is folded in one direction, the unfolding area, the folding area, and the unfolding area may be sequentially formed.

A plurality of pattern parts reducing and distributing stress generated when the elastic member 1000 is folded may be formed in at least one of the first region 1A and the second region 2A. The pattern parts will be described in detail below.

Hereinafter, the elastic member according to various embodiments will be described with reference to the drawings.

Referring to FIGS. 4 to 7, an elastic member according to the first embodiment will be described.

Referring to FIGS. 4 and 5, a plurality of pattern parts may be disposed on the elastic member 1000.

In detail, a first pattern part PA1 may be disposed in the first region 1A of the elastic member 1000. Also, a second pattern part PA2 may be disposed in the second region 2A of the elastic member 1000. However, the embodiment is not limited thereto, and the first pattern part PA1 may be disposed only in the first region 1A, and the second pattern part PA2 may not be disposed in the second region 2A. That is, the pattern part may be disposed only in the first region 1A.

The first pattern part PA1 and the second pattern part PA2 may be defined as a set of a plurality of patterns.

Referring to FIGS. 4 to 6, the first pattern part PA1 and the second pattern part PA1 may be formed through the elastic member 1000. In detail, the first pattern part PA1 and the second pattern part PA1 may be formed by penetrating the first surface 1S and the second surface 2S of the elastic member 1000. That is, the first pattern part PA1 and the second pattern part PA1 may be formed in a hole shape penetrating the elastic member 1000.

However, the embodiment is not limited thereto, and any one pattern part of the first pattern part PA1 and the second pattern part PA2 may be formed in a groove shape penetrating the first surface 1S or the second surface 2S.

For example, the first pattern part PA1 may be formed in a hole shape, and the second pattern part PA2 may be formed in a groove shape.

At least one pattern part of the first pattern part PA1 and the second pattern part PA2 may extend in the same or similar direction as the folding axis and may be disposed.

The elastic member 1000 may be easily folded by the first pattern part PA1 disposed in the first region 1A.

That is, the elastic member 1000 may reduce the thickness of the first region 1A folded in the elastic member 1000 by the first pattern part PA1. That is, the elastic member 1000 may reduce an area having a thickness in the first region 1A by the first pattern part PA1.

Accordingly, a stress generation area generated when the elastic member 1000 is folded may be reduced. That is, compressive stress generated when the elastic member 1000 is folded may be reduced by reducing a thickness area of the elastic member 1000 proportional to the compressive stress in the first region 1A, which is a folding region of the elastic member 1000.

That is, since a thickness area of the elastic member 1000 is reduced in a region where the elastic member 1000 is folded by the first pattern part PA1, and thus compressive stress is reduced, the elastic member 1000 M\may be easily folded.

The second pattern part PA2 disposed in the second region 2A may improve reliability of the elastic member 1000.

In detail, the difference in deformation caused by heat between the first region 1A where the first pattern part PA1 and the second region 2A is disposed may be alleviated by the second pattern part PA2 disposed in the second region 2A. That is, since the pattern part is formed in both the first region 1A and the second region 2A, when heat is applied to the elastic member 1000, a difference in deformation due to heat between the first region 1A and the second region 2A may be alleviated. Accordingly, it is possible to prevent bending or twisting of the elastic member 1000.

In addition, stress unevenness between the first region 1A and the second region 2A may be alleviated by the second pattern part PA2 formed in the second region 2A, thereby preventing bending of the elastic member 1000.

In addition, when a panel or the like is adhered to the elastic member 1000 through an adhesive layer, an adhesive material is disposed to fill the inside of the first pattern part PA1 of the first region 1A and the second pattern part PA2 of the second region 2A by the second pattern part PA2 formed in the second region 2A, and thus it is possible to prevent the adhesive layer from forming a step difference between the first region and the second region.

In addition, the elastic member 1000 may maintain a constant strength even when the second pattern part PA2 is formed in the second region 2A. In detail, since an area in which a pattern part such as a hole or groove is not formed remains in the second region 2A, an area of the elastic member 1000 in which a pattern portion is not formed may be secured. Therefore, the strength of the elastic member may be secured, and the supporting force of the elastic member 1000 supporting the panel or the like may be secured.

FIG. 7 is an enlarged view of area A of FIG. 4, which is an enlarged view of a first region 1A of the elastic member 1000, that is, a folding area.

Referring to FIG. 7, the first region 1A may be defined as a plurality of regions. In detail, the first region may include a 1-1 region 1-1A, a 1-2 region 1-2A, and a 1-3 region 1-3A.

The 1-1 region 1-1A may be disposed between the 1-2 region 1-2A and the 1-3 region 1-3A. In detail, the 1-1 region 1-1A may be disposed in a central area of the first region 1A, and the 1-2 region 1-2A and the 1-3 region 1-3A may be disposed in an outer area of the first region 1A. In more detail, the 1-1 region 1-1A may be defined as a region relatively close to the folding axis, and the 1-2 region 1-2A and the 1-3 region 1-3A may be regions relatively far from the folding axis. That is, the 1-1 region 1-1A may be a region closer to the folding axis than other regions of the first region 1A.

For example, the width W1 of the 1-1 region 1-1A may be about 25% to 35% of the total width of the first region.

As the first region 1-1A is a folding region in which the elastic member 1000 is folded, and compressive stress generated when the elastic member 1000 is folded may be different for each position of the first region 1A. In detail, when the elastic member is folded, the 1-1 region 1-1A, which is the central region of the first region, is bent more than the 1-2 region 1-2A and the 1-3 region 1-3A, which are outer regions of the first region, so that a greater compressive stress occurs.

Accordingly, the 1-1 region 1-1A is not easy to fold compared to the 1-2 region 1-2A and the 1-3 region 1-3A, and plastic deformation or the like may occur due to compressive stress and tensile stress during folding and restoration.

Accordingly, the elastic member according to the first embodiment solves the above problem by changing the size and shape of the first pattern part formed in the first region.

Referring to FIG. 7, a plurality of patterns may be disposed in the 1-1 region 1-1A. That is, a plurality of patterns constituting the first pattern part PA1 may be disposed in the 1-1 region 1-1A.

In detail, a first pattern part formed by a bridge part and extending in the first direction 1D may be disposed in the 1-1 region 1-1A.

The bridge part BA may extend the first pattern part PA1 in the second direction.

Referring to FIG. 7, the first pattern part PA1 including a first pattern P1, a second pattern P2, and a third pattern P3 may be disposed in the 1-1 region 1-1A. That is, the first pattern P1 disposed in the central area of the 1-1 region 1-1A based on the folding axis, and the second and third patterns P2 and P3 disposed in the outer area of the 1-1 region 1-1A based on the folding axis may be disposed in the 1-1 region 1-1A.

The first pattern P1 may be disposed between the second pattern P2 and the third pattern P3. That is, the first pattern P1 may be disposed in a central area of the 1-1 region 1-1A, and the second and third patterns P2 and P3 may be disposed in an outer area of the 1-1 region 1-1A. That is, the first pattern P1 may be disposed closer to the folding axis than the second and third patterns P2 and P3.

The first pattern P1, the second pattern P2, and the third pattern P3 may be formed as one hole in each area of the 1-1 region 1-1A. In detail, each of the first pattern P1, the second pattern P2, and the third pattern P3 may be formed in a single hole shape formed by a plurality of bridge parts BA. That is, the first pattern P1, the second pattern P2, and the third pattern P3 may be formed in a shape in which both ends are closed in the 1-1 region 1-1A.

In addition, the patterns formed in the 1-2 region 1-2A and the 1-3 region 1-3A may also be formed to have a plurality of bridge parts BA.

The number of bridge parts BA in the 1-1 region 1-1A may be different from the number of bridge parts BA in the 1-2 region 1-2A and the 1-3 region 1-3A.

In detail, the number of bridge parts BA in the 1-1 region 1-1A may be smaller than the number of bridge parts BA in the 1-2 region 1-2A and the 1-3 region 1-3A.

In detail, the number of bridge parts BA in the 1-1 region 1-1A may be 50% or less of the number of bridge parts BA in the 1-2 region 1-2A and the 1-3 region 1-3A. In more detail, the number of bridge parts BA in the 1-1 region 1-1A may be 40% or less of the number of bridge parts BA in the 1-2 region 1-2A and the 1-3 region 1-3A. In more detail, the number of bridge parts BA in the 1-1 region 1-1A may be 30% or less of the number of bridge parts BA in the 1-2 region 1-2A and the 1-3 region 1-3A. In more detail, the number of bridge parts BA in the 1-1 region 1-1A may be 20% or less of the number of bridge parts BA in the 1-2 region 1-2A and the 1-3 region 1-3A. In more detail, the number of bridge parts BA in the 1-1 region 1-1A may be 10% or less of the number of bridge parts BA in the 1-2 region 1-2A and the 1-3 region 1-3A.

For example, the number of bridge parts in 1-1 region 1-1A may be 10 or less. In detail, the number of bridge parts in 1-1 region 1-1A may be 8 or less. In detail, the number of bridge parts in 1-1 region 1-1A may be 5 or less. In detail, the number of bridge parts in 1-1 region 1-1A may be 3 or less. In detail, the number of bridge parts in 1-1 region 1-1A may be 2 or less.

Accordingly, the area of the pattern of the 1-1 region 1-1A may be increased compared to the 1-2 region 1-2A and the 1-3 region 1-3A. That is, since one integrally formed pattern is formed in the shape of a hole instead of a plurality of patterns spaced apart from each other in the 1-1 region 1-1A, the area of the pattern formed in the 1-1 region 1-1A may be increased.

That is, since the number of bridge parts BA in the 1-1 region 1-1A is smaller than that of the 1-2 region 1-2A and the 1-3 region 1-3A, the area of the pattern may be increased.

Accordingly, when the elastic member 1000 is folded, the magnitude of stress in the 1-1 region 1-1A, where a relatively greater compressive stress is generated than in other regions, may be alleviated.

Meanwhile, widths of the first pattern P1, the second pattern P2, and the third pattern P3 may be different from each other. Here, the widths of the first pattern P1, the second pattern P2, and the third pattern P3 may be widths of the elastic member 1000 in the second direction 2D.

In detail, the width W2-1 of the first pattern P1 may be greater than the width W2-2 of the second pattern P2 and the width W2-3 of the third pattern P3. That is, the width W2-1 of the first pattern P1 disposed in the central region of the 1-1 region 1-1A may be greater than the widths W2-2 and W2-3 of the second and third patterns P2 and P3 disposed in the outer region of the 1-1 region 1-1A.

For example, the width W2-1 of the first pattern P1, the width W2-2 of the second pattern P2, and the width W2-3 of the third pattern P3 may be greater than intervals between the first pattern P1, the second pattern P2, and the third pattern P3, and smaller than the width W1 of the first region 1-1A.

For example, the width W2-1 of the first pattern P1 may be greater than 0.75 mm to 0.9 mm, and the width W2-2 of the second pattern P2 and the width W2-3 of the third pattern P3 may be 0.75 mm or less.

Meanwhile, a plurality of hinge parts may be disposed in the first region 1A. The hinge part may be formed only in the first region 1A as an area in which an end region of the elastic member 1000 is opened for folding of the elastic member 1000. Accordingly, the hinge part is a point at which folding of the elastic member 1000 starts, and the first region 1A and the second region 2A of the elastic member 1000 may be divided depending on whether or not the hinge portion is formed.

Referring to FIG. 7, hinge parts may be disposed in the 1-1 region 1-1A, the 1-2 region 1-2A, and the 1-3 region 1-3A. In detail, a first hinge part HN1 may be disposed in the 1-1 region 1-1A, a second hinge part HN2 may be disposed in the 1-2 region 1-2A, and a third hinge part HN3 may be disposed in the 1-3 region 1-3A.

In addition, a 1-1 hinge part HN1-1 spaced apart from the first pattern P1 in the first direction 1D, a 1-2 hinge part HN1-2 spaced apart from the second pattern P2 in the first direction 1D, and a 1-3 hinge part HN1-3 spaced apart from the third pattern P3 in the first direction 1D may be disposed in the 1-1 region 1A.

That is, the hinge parts of the 1-1 region may be spaced apart from each other by the patterns and the bridge part BA.

At least one of the 1-1 hinge part HN1-1, the 1-2 hinge part HN1-2, and the 1-3 hinge part HN1-3 may be larger than the second hinge HN2 part and the third hinge part HN3. That is, the area of at least one of the 1-1 hinge part HN1-1, the 1-2 hinge part HN1-2, and the 1-3 hinge part HN1-3 may be larger than the area of the second hinge part HN2 and the area of the third hinge part HN3.

Here, the area of the hinge part may be defined as a value obtained by multiplying the length and the width of the hinge part.

For example, the length of the 1-1 hinge part HN1-1, the length of the 1-2 hinge part HN1-2, and the length of the 1-3 hinge part HN1-2 may be longer than the length of the second hinge part HN2 and the length of the third hinge part HN3.

Alternatively, the width of the 1-1 hinge part HN1-1, the width of the 1-2 hinge part HN1-2, and the width of the 1-3 hinge part HN1-3 may be greater than the width of the second hinge part HN2 and the width of the third hinge part HN3.

Accordingly, when the elastic member 1000 is folded, the area of the hinge part in the 1-1 region having a higher compressive stress than other areas is formed to be larger than the area of the hinge part in the 1-2 region and the 1-3 region, and thus the elastic member may be easily folded in the 1-1 region 1-1A.

In addition, the 1-1 hinge part HN1-1, the 1-2 hinge part HN1-2, and the 1-3 hinge part HN1-3 may have different sizes. In detail, the size of the 1-1 hinge part HN1-1 may be larger than the size of the 1-2 hinge part HN1-2 and the size of the 1-3 hinge part HN1-3. That is, the area of the 1-1 hinge part HN1-1 may be larger than the area of the 1-2 hinge part HN1-2 and the area of the 1-3 hinge part HN1-3.

For example, the length of the 1-1 hinge part HN1-1 may be longer than the length of the 1-2 hinge part HN1-2 and the length of the 1-3 hinge part HN1-3.

Alternatively, the width of the 1-1 hinge part HN1-1 may be greater than the width of the 1-2 hinge part HN1-2 and the width of the 1-3 hinge part HN1-3.

when the elastic member 1000 is folded, since the area of the 1-1 hinge part HN1-1 close to the folding axis is larger than the areas of the 1-2 and 1-3 hinge parts HN1-2 and HN1-3 relatively far from the folding axis, the elastic member may be easily folded in the central region of the 1-1 region 1-1A where the compressive stress is high.

In addition, the distance between the hinge parts disposed in the 1-1 region 1-1A may be smaller than the distance between the hinge parts disposed in the 1-2 region 1-2A, and the distance between the hinge parts disposed in the 1-1 region 1-1A may be smaller than the distance between the hinge parts disposed in the 1-3 region 1-3A.

In detail, the distance S1 between the 1-1 hinge part HN1-1, the 1-2 hinge part HN1-1 and the 1-3 hinge part HN1-3 disposed in the 1-1 region 1-1A may be smaller than the distance S2 between the second hinge parts HN2 disposed in the 1-2 region 1-2A and the distance S3 between the third hinge parts HN3 disposed in the 1-3 region 1-3A.

Accordingly, the first hinge parts HN1 disposed in the 1-1 region 1-1A may be more densely disposed than the second hinge part HN2 and the third hinge part HN3 disposed in the 1-2 region 1-2A and the 1-3 region 1-3A. Therefore, the area per unit area of the first hinge part HN1 disposed in the 1-1 region 1-1A may be greater than the area per unit area of the second hinge part HN2 and the third hinge part HN3 disposed in the 1-2 region 1-2A and the 1-3 region 1-3A.

Accordingly, when the elastic member 1000 is folded, the area per unit area of the hinge part in the 1-1 region having a higher compressive stress than other areas is formed to be larger than the area per unit area of the hinge part in the 1-2 region and the 1-3 region, and thus the elastic member may be easily folded in the 1-1 region 1-1A.

In the elastic member according to the first embodiment, the size of the first pattern part and the hinge part disposed in the folding area may be different.

That is, since the size and area of the first pattern part in the folding region close to the folding axis is larger than that of the first pattern part in the folding region far from the folding axis, when the elastic member is folded, the elastic member may be easily folded in a region close to a folding axis where the compressive stress is relatively high, and plastic deformation due to tensile stress may be reduced.

In addition, since the size and area of the hinge part in the folding region close to the folding axis is larger than that of the hinge part in the folding region far from the folding axis, when the elastic member is folded, the elastic member may be easily folded in a region close to a folding axis where the compressive stress is relatively high.

In addition, since the distance between the hinge parts in the folding region close to the folding axis is smaller than the distance between the hinge parts in the folding region far from the folding axis, when the elastic member is folded, the elastic member may be easily folded in a region close to a folding axis where the compressive stress is relatively high.

Therefore, the elastic member according to the first embodiment may easily fold the elastic member and reduce plastic deformation due to tensile stress during restoration.

Hereinafter, an elastic member according to a second embodiment will be described with reference to FIGS. 8 to 15. In the description of the elastic member according to the second embodiment, descriptions of identical or similar elements to those of the elastic member according to the above-described embodiment will be omitted, and the same reference numerals will be assigned to the same compositions.

Referring to FIGS. 8 and 9, the elastic member according to the second embodiment may include a plurality of pattern parts PA.

In detail, the first pattern part PA1 may be disposed in the first region 1*a* of the elastic member 1000. Also, the second pattern part PA2 may be disposed in the second region 2A of the elastic member 1000.

Referring to FIGS. 8 to 11, the first pattern part PA1 and the second pattern part PA2 may be formed to partially penetrate the elastic member 1000. In detail, the first pattern part PA1 and the second pattern part PA2 may be formed through the second surface 2S of the elastic member 1000. That is, the first pattern part PA1 and the second pattern part PA2 may be formed in a groove shape formed in the elastic member 1000.

Accordingly, the second layer may be exposed by the first pattern part PA1 and the second pattern part PA2 in a region where the first pattern part PA1 and the second pattern part PA2 are disposed.

Referring to FIGS. 10 and 11, the elastic member 1000 may be formed in multiple layers. In detail, the elastic member 1000 may include a first layer 1100 and a second layer 1200 on the first layer 1100.

Referring to FIG. 10, the first layer 1100 and the second layer 1200 may be disposed in contact with each other. That is, the upper surface of the first layer 1100 and the lower surface of the second layer 1200 may be disposed in direct contact with each other.

The first layer 1100 and the second layer 1200 may be manufactured in a clad manner so as to directly contact each other.

Clad bonding is a method of bonding the first layer 1100 and the second layer 1200 by a method such as welding, rolling, casting, or extrusion without bonding using an adhesive, and it is possible to show better bonding force over time by destroying a mutual organization of each layer and stabilizing the bonding of each layer through interstitial penetration.

However, the embodiment is not limited thereto, and as shown in FIG. 11, an adhesive layer 1500 may be disposed between the first layer 1100 and the second layer 1200, and the first layer 1100 and the second layer 1200 may be adhered by the adhesive layer 1500.

The first layer 1100 and the second layer 1200 may include metal. For example, the first layer 1100 and the second layer 1200 may include different types of metals.

Thermal conductivity of the first layer 1100 and thermal conductivity of the second layer 1200 may be different from each other. In detail, the thermal conductivity of the first layer 1100 may be greater than that of the second layer 1200. Accordingly, the first layer 1100 may have improved heat dissipation characteristics compared to the second layer 1200.

In addition, the yield strength of the first layer 1100 and the yield strength of the second layer 1200 may be different from each other. In detail, the yield strength of the second layer 1200 may be greater than that of the first layer 1100. Accordingly, the strain of the second layer 1200 may be smaller than that of the first layer 1100.

For example, the first layer 1100 may include copper (Cu) and the second layer 1200 may include SUS, but the embodiment is not limited thereto, and the first layer 1100 and the second layer 1200 may include various materials satisfying the thermal conductivity and the yield strength.

FIG. 12 is an enlarged view of area B of FIG. 9, showing an enlarged view of a first area of the second surface 2S of the elastic member 1000, that is, a folding area.

Referring to FIG. 12, the first region 1A may be defined as a plurality of region s. In detail, the first region 1A may include the 1-1 region 1-1A, the 1-2 region 1-2A, and the 1-3 region 1-3A.

Referring to FIG. 12, the first pattern P1 and the second pattern P2 may be disposed in the 1-1 region 1-1A. In detail, the first pattern P1 and the second pattern P2 spaced apart from each other may be disposed in the 1-1 region 1-1A.

The first pattern P1 and the second pattern P2 may be integrally formed with the hinge part. That is, unlike the elastic member according to the first embodiment described above, the hinge part and the pattern may not be spaced apart from each other, and the hinge part and the pattern may be integrally formed.

That is, the first pattern P1 and the second pattern P2 may extend to both ends of the first layer 1100 in the first direction 1D. That is, the first pattern P1 and the second pattern P2 may be formed in a shape in which both ends are opened in the 1-1 region 1-1A.

Accordingly, the sizes of the first pattern P1 and the second pattern P2 may increase. That is, since the first pattern P1 and the second pattern P2 are formed through both ends of the first layer 1100 in the first direction 1D so that the first pattern P1 and the second pattern P2 can serve as a hinge part, a separate hinge part not formed. Accordingly, it is possible to remove the bridge part separating the pattern and the hinge part.

In addition, even if the first pattern P1 and the second pattern P2 are formed in a shape with both ends open in the 1-1 region 1-1A, since the second layer 1200 on the first layer 1100 supports the first layer 1100, even if the patterns are formed the first layer 1100 may be supported.

Therefore, when the elastic member 1000 is folded, the thickness area of the 1-1 region 1-1A, where a relatively larger compressive stress occurs than other regions, may be reduced, so that the size of the stress generated in the 1-1 region 1-1A may be alleviated.

A support part SA formed by remaining the first layer 1100 may be formed between the first pattern P1 and the second pattern P2. That is, the support part SA may include the same material as the first layer 1100. In addition, the support part SA may be integrally formed with the first layer 1100.

The support part SA may serve to control the size of the first pattern P1 and the second pattern P2. That is, the size of the width of the first pattern P1 and the second pattern P2 in the first direction 1D may be changed by changing the size of the width of the support part SA in the first direction 1D.

Accordingly, it is possible to prevent a portion of the panel disposed on the elastic member 1000 from sinking into the pattern due to the width of the first pattern P1 and the second pattern P2.

In detail, when the widths of the first pattern P1 and the second pattern P2 disposed in the 1-1 region 1-1A are too large, the second layer 1200 disposed on the first layer 1100 is disposed inside the pattern in an area overlapping the pattern or, the panel disposed on the elastic member 1000 may sink into the pattern in an area overlapping the pattern.

Accordingly, the elastic member according to the second embodiment may prevent the second layer or panel from sinking due to the support part SA controlling the size of the first pattern P1 and the second pattern P2.

FIGS. 13 to 15 are views of various shapes of area B of FIG. 9.

Referring to FIG. 13, the first pattern P1 and the second pattern P2 may be connected to each other in the 1-1 region 1A of the elastic member 1000 according to the second embodiment.

In detail, the length of the support part SA disposed in the 1-1 region 1A may be smaller than the width between both ends of the elastic member 1000 in the first direction 1D. That is, the support part SA may be disposed spaced apart from both ends of the elastic member in the first direction 1D.

Accordingly, a connection pattern CP may be disposed between an end of the support part SA and an end of the elastic member in the first direction 1D.

The first pattern P1 and the second pattern P2 may be connected to each other by the connection pattern CP.

Accordingly, the size of the pattern may be formed large in the 1-1 region 1A.

Referring to FIG. 14, the first pattern P1, the second pattern P2, and the third pattern P3 may be disposed in the 1-1 region 1-1A of the elastic member 1000 according to the second embodiment. Also, the first pattern P1, the second pattern P2 and the third pattern P3 may be connected to each other.

In addition, a plurality of support parts may be disposed in the 1-1 region 1-1A. In detail, a first support part SA1 and a second support part SA2 may be disposed in the 1-1 region 1-1A.

The first support part SA1 and the second support part SA2 may be disposed apart from each other. Areas of the first pattern P1, the second pattern P2, and the third pattern P3 may be defined by the first support part SA1 and the second support part SA2.

Also, the length of the first support part SA1 and the length of the second support part SA2 may be smaller than the width between both ends of the elastic member in the first direction 1D. That is, the length of the first support part SA1 and the length of the second support part SA2 may be shorter than the lengths of the first pattern P1, the second pattern P2, and the third pattern P3.

That is, the first support part SA1 and the second support part SA2 may be disposed apart from both ends of the elastic member in the first direction 1D.

Accordingly, a first connection pattern CP1 is disposed between the end of the first support part SA1 and the end of the elastic member in the first direction 1D, and a second connection pattern CP2 is disposed between the end of the second support part SA2 and the end of the elastic member in the first direction 1D.

The first pattern P1, the second pattern P2, and the third pattern P3 may be connected to each other by the first connection pattern CP1 and the second connection pattern CP2.

Accordingly, the size of the pattern may be formed large in the 1-1 region 1-1A.

Referring to FIG. 15, a first pattern P1, a second pattern P2, a third pattern P3, and a fourth pattern P4 may be disposed in the 1-1 region 1-1A of the elastic member 1000 according to the second embodiment. In addition, the first pattern P1, the second pattern P2, the third pattern P3 and the fourth pattern P4 may be connected to each other.

In addition, a plurality of support parts may be disposed in the 1-1 region 1-1A. In detail, a first support part SA1, a second support part SA2, and a third support part SA3 may be disposed in the 1-1 region 1-1A.

In detail, the first support part SA1 may include a plurality of first sub-first support parts, the second support part SA2 includes a plurality of first sub-second support parts, and the third support part SA3 includes a plurality of first sub-third support parts The first support part SA1, the second support part SA2, and the third support part SA3 may be disposed apart from each other. Areas of the first pattern P1, the second pattern P2, the third pattern P3, and the fourth pattern P4 may be defined by the first support part SA1, the second support part SA2, and the third support part SA3.

In addition, the length of the first support part SA1, the length of the second support part SA2, and the length of the third support part SA3 may be formed smaller than a width between both ends of the elastic member in the first direction 1D. That is, the length of the first support part SA1, the length of the second support part SA2, and the length of the third support part SA3 may be shorter than the lengths of the first pattern P1, the second pattern P2, the third pattern P3, and the fourth pattern P4.

Accordingly, a first connection pattern CP1 is disposed between the end of the first support part SA1 and the end of the elastic member in the first direction 1D, a second connection pattern CP2 is disposed between the end of the second support part SA2 and the end of the elastic member in the first direction 1D, and a third connection pattern CP3 is disposed between the end of the third support part SA3 and the end of the elastic member in the first direction 1D.

In addition, a fourth connection pattern CP4 may be formed between the sub-support parts.

The first pattern P1, the second pattern P2, the third pattern P3, and the fourth pattern P4 may be connected to each other by the first connection pattern CP1, the second connection pattern CP2, the third connection pattern CP3, and the fourth connection pattern CP4. Accordingly, the size of the pattern may be formed large in the 1-1 region 1-1A.

Accordingly, it is possible to prevent the movement of stress in the 1-1 region 1-1A. For example, when compressive stress generated when folding the elastic member moves from the first support part SA1 to the third support part SA3, since the extension of the compressive stress to the third pattern P3 and the fourth pattern P4 may be blocked by the second support part SA2, damage to the elastic member due to stress concentration may be prevented.

In the elastic member according to the second embodiment, the pattern part of the folding region close to the folding axis may be wider.

Accordingly, when the elastic member is folded, the elastic member may be easily folded in a region close to a folding axis where the compressive stress is relatively high, and plastic deformation due to tensile stress may be reduced.

In addition, one or a plurality of support parts may be disposed on a region close to the folding axis, and a size of the support part may be controlled to prevent a panel on the elastic member from sinking by the pattern part due to the size of the pattern part.

In addition, by changing the position of the support part and connecting the pattern parts to each other, it is possible to improve the stress reduction effect by the pattern part, and since movement of the stress is blocked by the pattern parts, it is possible to prevent stress from being concentrated in a specific region.

Meanwhile, the elastic member may further include a third layer 1300.

FIG. 16 is a cross-sectional view of an elastic member according to a third embodiment.

Referring to FIG. 16, the elastic member 1000 may include a first layer 1100, a second layer 1200, and a third layer 1300. In detail, the elastic member 1000 may include a first layer 1100, a second layer 1200 disposed on the first layer 1100, and a third layer 1300 disposed on the second layer 1200.

At least one of the first layer 1100, the second layer 1200, and the third layer 1300 may include a metal. For example, the first layer 1100, the second layer 1200, and the third layer 1300 may include different types of metals. For example, the first layer 1100 and the third layer 1300 may include the same metal, and the first layer 1100 and the third 1300 layer may include a metal different from that of the second layer 1200.

In addition, at least one of the first layer 1100, the second layer 1200, and the third layer 1300 may include metals having different thermal conductivity. In addition, at least one of the first layer 1100, the second layer 1200, and the third layer 1300 may include metals having different yield strengths.

In addition, the first pattern part PA1 and the second pattern part PA2 may be formed on both the first surface 1S and the second surface 2S of the elastic member 1000.

That is, the first pattern part PA1 and the second pattern part PA2 may include the first pattern part PA1 and the second pattern part PA2 formed penetrating the first layer 1100 and the third layer 1300.

Hereinafter, a display device to which an elastic member according to an embodiment is applied will be described with reference to FIGS. 17 to 21.

Referring to FIGS. 17 to 21, a panel 2000 may be disposed on the elastic member 1000. The elastic member 1000 and the panel 2000 may be bonded by adhesive layers 100, 110, and 120 disposed between the elastic member 1000 and the panel 2000.

In detail, the panel 2000 may be disposed on the second layer 1200 or the third layer 1300 of the elastic member 1000.

The panel 2000 may include at least one of a display panel and a touch panel.

The display panel may include a plurality of pixels including a switching thin film transistor, a driving thin film transistor, a power storage device, and an organic light-emitting diode (OLED). In case of the OLED, deposition may be performed at a relatively low temperature, and the OLED may be mainly applied to a flexible display device for reasons such as low power and high luminance. Here, a pixel refers to a minimum unit for displaying an image, and the display panel displays an image through a plurality of pixels.

The display panel may include a substrate, a gate line disposed on the substrate, a data line crossing with the gate line in isolation, and a common power line. In general, one pixel may be defined by the gate line, the data line, and the common power line as a boundary.

The substrate may include a material having flexible properties such as a plastic film, and the display panel may be implemented by disposing an organic light-emitting diode and a pixel circuit on a flexible film.

The touch panel may be disposed on the display panel. The touch panel may implement a touch function in the flexible display device, and the touch panel may be omitted in the foldable display device that simply displays an image without the touch function.

The touch panel may include a substrate and a touch electrode disposed on the substrate. The touch electrode may sense a position of an input device that is touched on the foldable of flexible display device using a capacitance type or a resistive film type.

The substrate of the touch panel may include a material having flexible properties such as a plastic film, and the touch panel may be implemented by disposing the touch electrode on the flexible film.

Meanwhile, the elastic member 1000 and the panel 2000 may have different sizes.

For example, the area of the elastic member 1000 may be 90% or more to 110% or less of the area of the panel 2000. In detail, the area of the elastic member 1000 may be 95% or more to 105% or less of the area of the panel 2000. In more detail, the area of the elastic member 1000 may be 97% or more to 100% or less of the area of the panel 2000.

When the area of the elastic member 1000 is 90% or less of the area of the panel 2000, the supporting force of the elastic member 1000 to support the panel 2000 may be reduced, whereby a curl may occur in the unfolding area of the elastic member 1000. Accordingly, when the user visually recognizes the screen area, visibility may decrease, and when the touch is driven, a touch malfunction may occur because the screen of the touch area is incomplete due to the curl area.

An addition, when the area of the elastic member 1000 is greater than 110% of the area of the panel 2000, a supporting force for supporting the panel 2000 by the elastic member 1000 may be secured, but a bezel area of a display device including the elastic member, the display panel, and the touch panel may increase. As a result, since the screen area available to the user cannot be widened, it may cause inconvenience in using the display device.

Meanwhile, although not shown in the drawings, a cover window for protecting the foldable display device or the flexible display device may be additionally disposed on the panel 2000.

Referring to FIG. 17, the display device may further include a heat dissipation layer 1800. That is, when the elastic member 1000 is formed of a single layer, the heat dissipation layer 1800 may be disposed under the elastic member 1000, and heat generated during driving of the display device may be discharged to the outside through the heat dissipation layer 1800.

Referring to FIGS. 17 to 21, the display device may further include a protective layer 3000. In detail, the display device may further include a protective layer 3000 disposed under the elastic member 1000.

The protective layer 3000 may be disposed under the elastic member 1000 to absorb shock applied to the elastic member 1000.

The protective layer 3000 may have a color. For example, the protective layer 3000 may be formed in a black-based color.

The protective layer 3000 may include metal particles. For example, the protective layer 3000 may include copper particles. Accordingly, thermal conductivity of the protective layer 3000 may be improved, and heat generated in the display device may be discharged through the protective layer 3000.

The protective layer 3000 may be disposed on one region of the elastic member 1000. In detail, the protective layer 3000 may be disposed in a region corresponding to the first region 1A of the elastic member 1000. Alternatively, the protective layer 3000 may be disposed in regions corresponding to the first region 1A and the second region 2A of the elastic member 1000.

For example, the protective layer 3000 may be disposed in a region corresponding to the first region 1A and the second region 2A of the elastic member 1000, and an area of the protective layer 3000 may be smaller than a sum of the first region 1A and the second region 2A. In detail, an area of the protective layer 3000 may be 80% to 90% of a total area of the first area 1A and the second area 2A of the elastic member 1000.

Also, the thickness of the protective layer 3000 may be smaller than the thickness of the elastic member 1000. That is, the thickness of the protective layer 3000 may be smaller than the sum of the thicknesses of the first and second layers or the sum of the thicknesses of the first, second, and third layers of the elastic member 1000.

Meanwhile, referring to FIGS. 17 and 21, the display device may further include a planarization layer 4000.

In detail, when the pattern part of the elastic member 1000 has a hole shape, or when the elastic member 1000 includes a first layer, a second layer, and a third layer, and the pattern part is formed on the first layer and the third layer, the planarization layer 4000 may be disposed on the elastic member to planarize an adhesive surface of the third layer bonded to the panel.

That is, a first adhesive layer 1510 is disposed between the elastic member 1000 and the planarization layer 4000, so that the elastic member 1000 and the planarization layer 4000 are bonded, and a second adhesive layer 1520 may be disposed between the planarization layer 4000 and the panel 2000 to adhere the planarization layer 4000 to the panel 2000.

Accordingly, when the adhesive layer is disposed between the elastic member 1000 and the display panel 2000, it is possible to prevent the thickness of the adhesive layer in regions from being varied by the pattern parts. Therefore, the reliability of the display device may be improved by preventing the adhesion between the elastic member 1000 and the display panel 2000 from being reduced due to the uneven thickness of the adhesive layer.

Referring to FIGS. 17 to 21, the display device may be bendable. That is, the display device may be bent or folded in one direction. For example, the display device may be bent in the direction of an arrow. That is, the display device may be bent or folded in a direction in which the upper surfaces of the panels face each other.

However, the embodiment is not limited thereto, and the display device may be bent in the opposite direction. That is, the display device may be bent or folded in a direction in which lower surfaces of the protective layer face each other.

FIG. 22 is a view for explaining an example in which the elastic member according to embodiments is applied.

Referring to FIG. 22, the elastic member according to embodiments may be applied to a flexible or foldable display device displaying a display.

For example, the elastic member according to the embodiments may be applied to flexible display devices such as mobile phones and tablets.

Such the elastic member may be applied to the flexible display device such as a mobile phone, a tablet, or the like that is flexible, bendable, or folded.

The elastic member may be applied to a flexible display device such as a mobile phone or a tablet that is flexible, bent, or folded, and may improve reliability of a flexible display device by improving folding reliability in a display device that is repeatedly folded or restored.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically shown in the embodiments may be modified and implemented. In addition, it should be construed that differences related to such a variation and such an application are included in the scope of the present invention defined in the following claims.

The invention claimed is:

1. An elastic member including a first region and a second region, wherein the first region is defined as a folding region, and the second region is defined as an unfolding region, wherein the elastic member includes a first direction defined as a width direction of the elastic member and a direction in which a folding axis extends; and a second direction defined as a longitudinal direction of the elastic member and perpendicular to the first direction, wherein the first region includes a hinge part and a first pattern part including a plurality of patterns spaced apart from the hinge part with a bridge part interposed therebetween and extending in the first direction, wherein the second region includes a second pattern part including a plurality of patterns extending in the first direction, wherein the plurality of patterns of the first pattern part are formed in a hole shape, wherein the plurality of patterns of the second pattern part are formed in a groove shape, wherein the first region includes a 1-1 region closer to the folding axis and a 1-2 region and a 1-3 region spaced apart in the second direction with the 1-1 region interposed therebetween and farther from the folding axis than the 1-1 region, wherein the patterns and the bridge part of the first pattern part are provided in each of the 1-1 region, the 1-2 region, and the 1-3 region, wherein a length in the first direction of the pattern provided in the 1-1 region is greater than a length in the first direction of the pattern provided in the 1-2 region and a length in the first direction of the pattern provided in the 1-3 region, wherein a width in the second direction of the pattern provided in the 1-1 region is greater than a width in the second direction of the pattern provided in the 1-2 region and a width in the second direction of the pattern provided in the 1-3 region, and wherein a number of bridge parts in the 1-1 region is smaller than a number of bridge parts in each of the 1-2 region and the 1-3 region, wherein the elastic member further includes a first end region and a second end region facing each other in the first direction, wherein the patterns formed in the 1-1 region include a first pattern disposed in a central region of the 1-1 region with respect to the folding axis, and a second pattern and a third pattern disposed in an outer region of the 1-1 region so as to be directly adjacent to the first pattern in the second direction, wherein the first pattern, the second pattern, and the third pattern are spaced apart from each other in the second direction, wherein a width of the first pattern in the second direction is greater than a width of each of the second pattern and the third pattern in the second direction, wherein the width of each of the first pattern, the second pattern, and the third pattern in the second direction is greater than a spacing in the second direction between the first pattern and the second pattern and a spacing in the second direction between the first pattern and the third pattern, wherein the hinge part includes at least one first hinge part formed in the 1-1 region, spaced apart from the first to third patterns, and having the first end region and the second end region opened, wherein the at least one first hinge part includes a 1-1 hinge part formed such that the first end region and the second end region are each opened between the first pattern and the first end region and between the first pattern and the second end region, a 1-2 hinge part formed such that the first end region and the second end region are each opened between the second pattern and the first end region and between the second pattern and the second end region, and a 1-3 hinge part formed such that the first end region and the second end region are each opened between the third pattern and the first end region and between the third pattern and the second end region, and wherein a length of the 1-1 hinge part in the first direction is greater than a length of the 1-2 hinge part in the first direction and a length of the 1-3 hinge part in the first direction.

2. The elastic member of claim 1, wherein the number of bridge parts in the 1-1 region is 50% or less of the number of bridge parts in each of the 1-2 region and the 1-3 region.

3. The elastic member of claim 1, wherein the width in the second direction of the first pattern is greater than 0.75 mm and less than 0.9 mm.

4. The elastic member of claim 1, wherein an area of the 1-1 hinge part is larger than an area of the 1-2 hinge part and an area of the 1-3 hinge part.

5. The elastic member of claim 1, wherein the hinge part further includes at least one second hinge part disposed in the 1-2 region and at least one third hinge part is disposed in the 1-3 region and wherein an area of the 1-1 hinge part, an area of the 1-2 hinge part, and an area of the 1-3 hinge part is different from an area of the at least one second hinge part and an area of the at least one third hinge part.

6. The elastic member of claim 5, wherein the area of the 1-1 hinge part, the area of the 1-2 hinge part, and wherein the area of the 1-3 hinge part are larger than the area of the at least one second hinge part and the area of the at least one third hinge part.

7. The elastic member of claim 1, wherein the at least one first hinge part comprises a plurality of first hinge parts, wherein the hinge part further includes a plurality of second hinge parts disposed in the 1-2 region and a plurality of third hinge parts disposed in the 1-3 region, and wherein a distance between the plurality of first hinge parts is different from a distance between the plurality of second hinge parts and a distance between the plurality of third hinge parts.

8. The elastic member of claim 7, wherein the distance between the plurality of first hinge parts is smaller than the distance between the plurality of second hinge parts and the distance between the plurality of third hinge parts.

9. The elastic member of claim 7, wherein an area per unit area of the plurality of first hinge parts is different from an area per unit area of the plurality of second hinge parts and an area per unit area of the plurality of third hinge parts.

10. The elastic member of claim 9, wherein the area per unit area of the plurality of first hinge parts is greater than the area per unit area of the plurality of second hinge parts and the area per unit area of the plurality of third hinge parts.

* * * * *